June 26, 1956  D. C. BROUGHTON  2,752,204
SILAGE DISTRIBUTING APPARATUS
Filed June 17, 1953  3 Sheets-Sheet 1
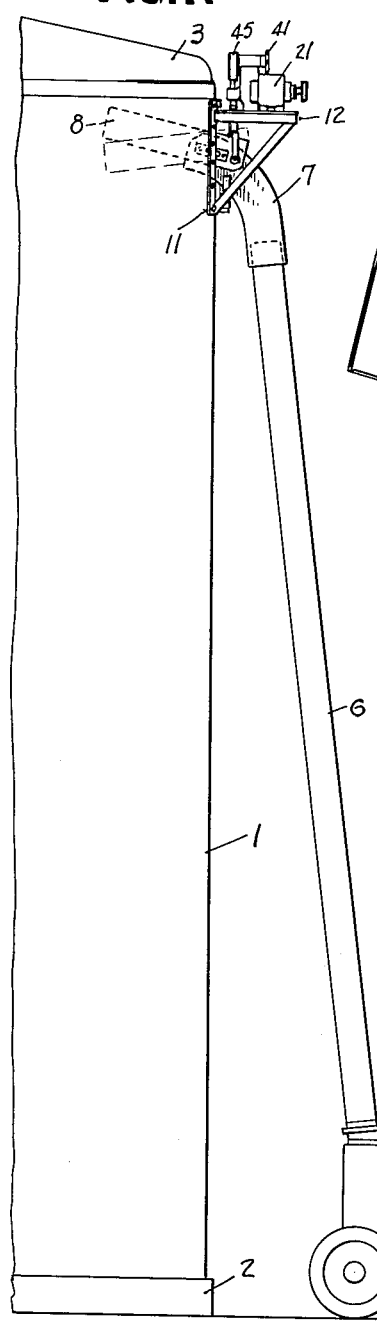
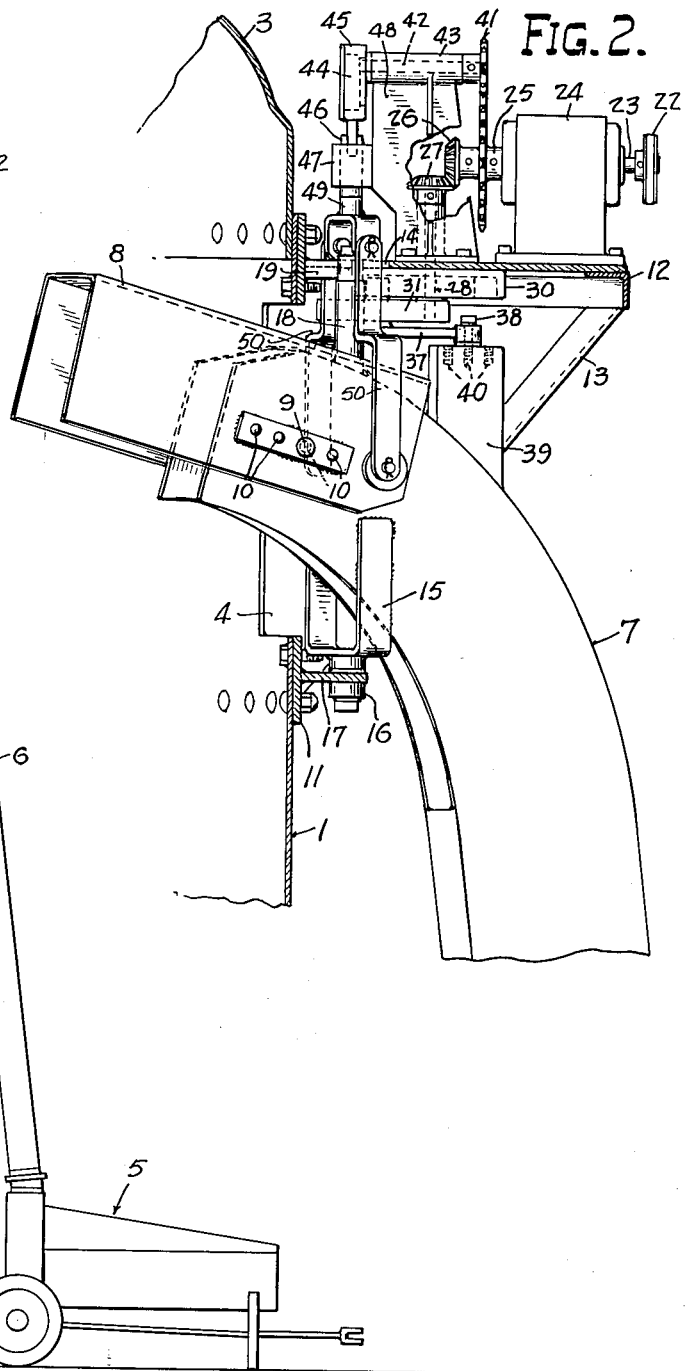
INVENTOR.
Dean C. Broughton
BY Andrus & Seeales
ATTORNEYS.

June 26, 1956  D. C. BROUGHTON  2,752,204
SILAGE DISTRIBUTING APPARATUS
Filed June 17, 1953

INVENTOR.
Dean C. Broughton
BY
Andrus & Seeales
ATTORNEYS.

June 26, 1956
D. C. BROUGHTON
2,752,204
SILAGE DISTRIBUTING APPARATUS
Filed June 17, 1953
3 Sheets-Sheet 3
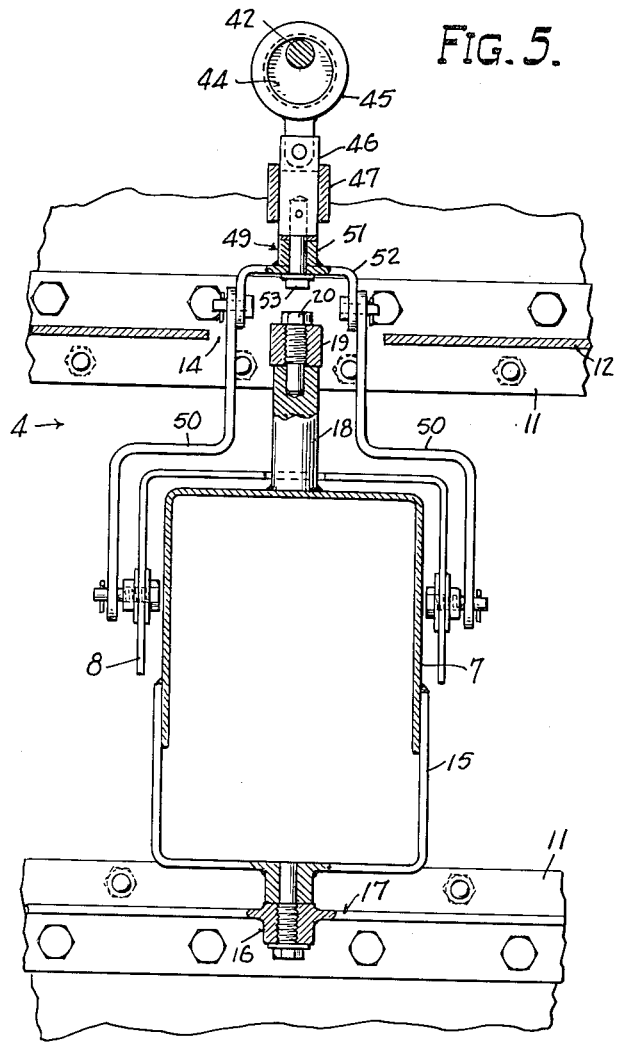
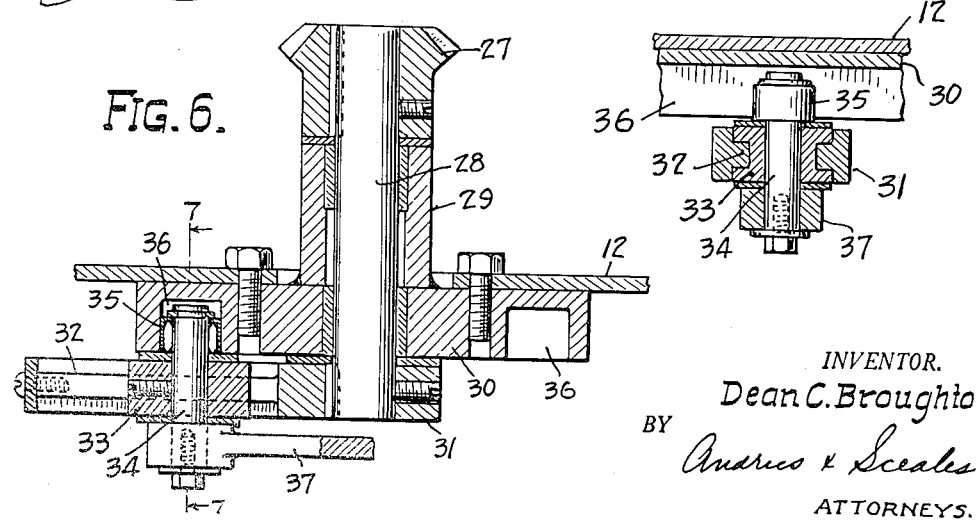
INVENTOR.
Dean C. Broughton
BY
Andrus & Sceales
ATTORNEYS.

United States Patent Office 2,752,204
Patented June 26, 1956

2,752,204

SILAGE DISTRIBUTING APPARATUS

Dean C. Broughton, Milwaukee, Wis., assignor to A. O. Smith Corporation, Milwaukee, Wis., a corporation of New York Application June 17, 1953, Serial No. 362,383

5 Claims. (Cl. 302—60)

This invention relates to a silage distributing apparatus and more particularly to an apparatus for uniformly distributing silage or other non-flowing materials into a storage vessel.

An object of the present invention is to provide an apparatus for uniformly distributing silage from a filler pipe into the upper portion of a silo.

Another object is to provide an apparatus for automatically actuating a silage discharge spout of a filler pipe in such a manner that the path inscribed by the spout when discharging silage into a silo is not repeated during the filling of the silo.

Another object is to provide an apparatus for automatically and uniformly distributing silage into a silo and thereby eliminating the requirement for manual leveling of the silage.

Still another object is to provide an apparatus for uniformly distributing silage into a silo whereby the apparatus may remain in position on the silo at all times and which may be readily attached to the filler pipe when the silo is to be filled.

According to the present invention, the filler pipe extends within a suitable opening in the upper portion of the silo and is adapted to conduct silage or other cut material from the blower and discharge the same into the top of the silo. The discharge end or spout of the pipe is pivoted about a vertical axis and given an oscillating horizontal motion about this axis by a cam drive.

A silage-directing hood is pivotally attached to the spout of the filler pipe and is pivoted vertically about the spout by an eccentric drive. Thus the hood will inscribe an approximate sine curve due to the vertical motion and the simultaneous horizontal oscillation imparted to the spout.

The gear ratios of the cam and eccentric drives are constructed so that the sine path inscribed by the hood will not be repeated during the time of a normal filling operation.

With this sine curve motion of the hood, the silage will be automatically distributed throughout the entire area of the silo in a uniform manner so that no manual leveling of the silage is required.

Other objects and advantages will appear in the course of the following description.

In the drawings:

Figure 1 is a fragmentary side elevation of a silo incorporating the present invention;

Fig. 2 is an enlarged fragmentary vertical section showing the apparatus for oscillating the spout and filler pipe;

Fig. 5 is a vertical section taken through the position of pivotal attachment of the spout;

Fig. 6 is a vertical section taken along line 6—6 of Fig. 4 showing the cam drive; and Fig. 7 is a vertical section taken along line 7—7 of Fig. 6.

Figure 3:
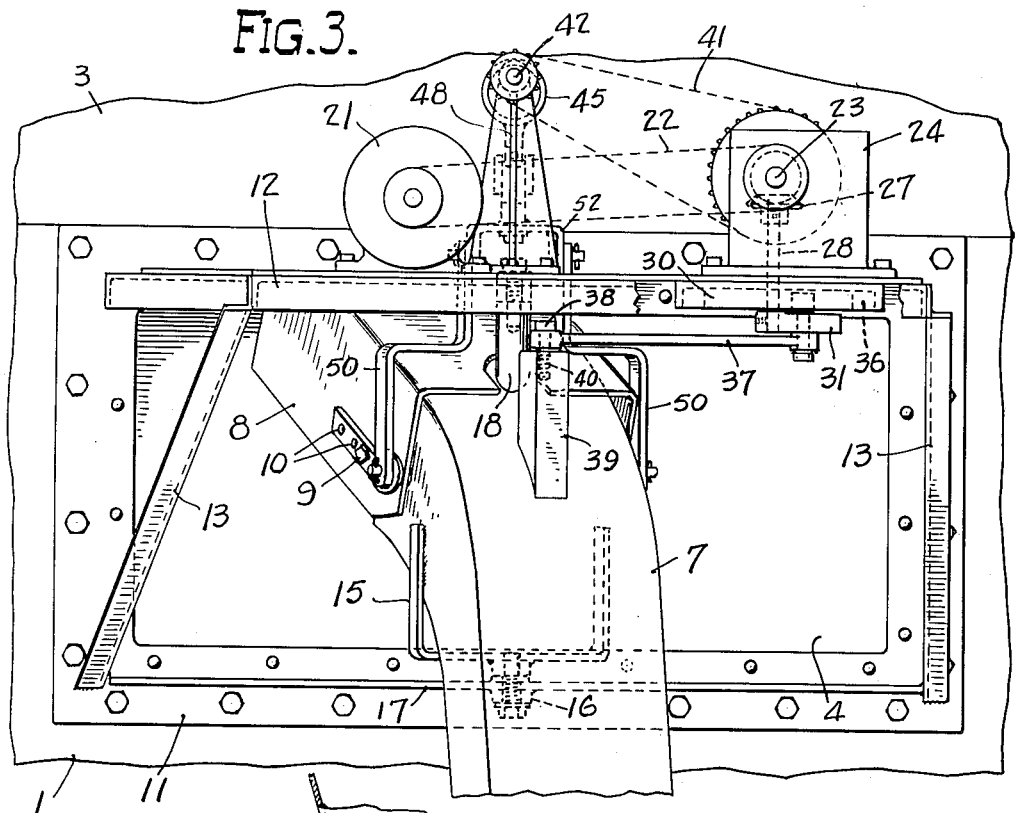
Fig. 3 is a rear elevation of the apparatus of the present invention as attached to the silo.
Figure 4:
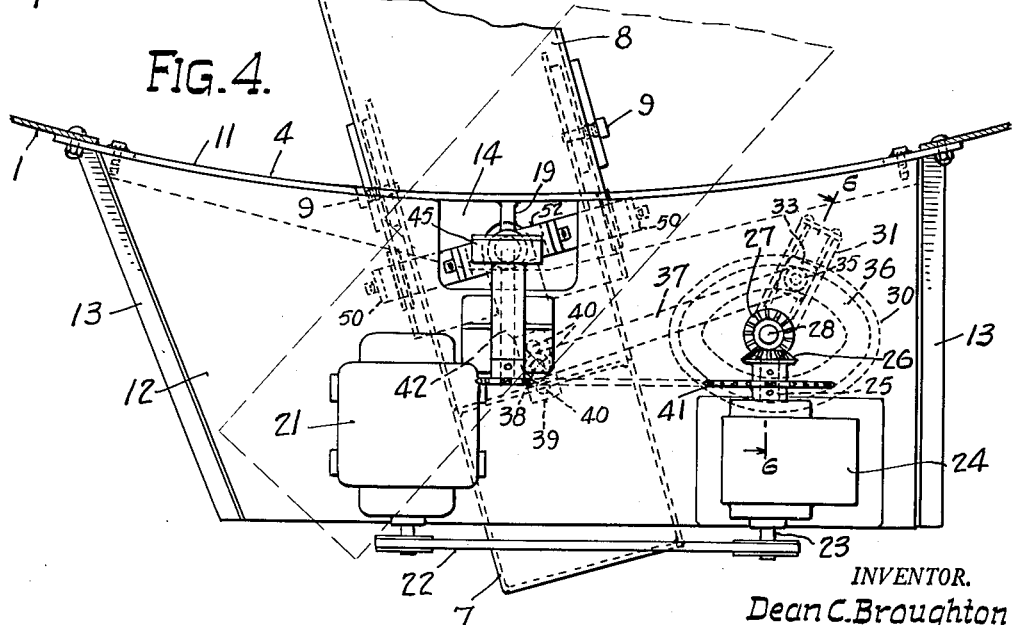
Fig. 4 is a top plan view of the apparatus of Fig. 3.

Referring to the drawings there is shown a silo 1 which is supported on a suitable foundation 2 and closed at the top by a roof 3.

To permit silage or other cut material to be discharged into the silo, an opening 4 is provided in the side wall of the silo adjacent the roof or in the roof itself.

A conventional blower unit 5 is disposed on the grade level adjacent the silo and is adapted to blow the silage upwardly through a filler pipe 6 into the silo via opening 4. The uppermost section 7 or spout of pipe 6 is curved and extends through opening 4 into the interior of the silo.

To prevent silage from clogging within the curved section 7, the lower portion of the spout 7 may be open, as shown in Figs. 2 and 5.

The discharge of the silage into the silo is directed by a hood 8 which is pivotally attached to the upper end of spout 7, as indicated by 9. Hood 8 is adapted to be pivoted vertically about the horizontal axis extending through the connections 9 and the magnitude of pivotal movement of the hood may be varied by the adjustment of the position of the pivotal connection 9. The hood 8 is provided with a series of spaced holes 10 and the pivotal connection to the spout 7 can be made through any of the holes as desired, and the magnitude of vertical pivotal movement will be inversely proportional to the distance between the pivotal connection 9 and the actuating force.

In addition to the vertical movement, the hood 8 and spout 7 are adapted to oscillate horizontally about a vertical axis so that the hood will inscribe a sine curve due to the simultaneous vertical and horizontal motions.

The apparatus to move the spout 7 and hood 8 is supported by a frame which is secured to the outer surface of silo 1 around the opening 4.

The frame comprises a generally rectangular plate 11 which is bolted to the silo 1 and has a central opening which is generally aligned with opening 4 and is of substantially the same size as opening 4.

A platform 12 extends outwardly from the upper portion of plate 11 and is supported at its outer corners by a pair of diagonal braces 13. To permit the vertical drive to pass through the platform, a generally rectangular recess 14 is formed in the platform adjacent the silo 1.

In order that the spout 7 may oscillate about a vertical axis, the spout is supported in a yoke 15 which is rotatably secured on a thrust bearing 16. Bearing 16 is suitably mounted on a bracket 17 which is welded edgewise to the lower horizontal section of rectangular plate 11.

To rotatably secure spout 7 from above, a hollow hub 18 is secured to the upper surface of the spout in alignment with the lower rotatable connection at bearing 16. The hub 18 is rotatably attached to a bracket 19 by bolt 20. Bracket 19 is secured edgewise to the upper horizontal section of plate 11 and extends outwardly within recess 14. By this construction, spout 7 is free to oscillate about the vertical axis extending through the bearing 16 and hub 18. Spout 7 is loosely joined to the lower sections of filler pipe 6 and the pipe itself is sufficiently flexible so that the spout may be pivoted in a wide arc.

The drive for the unit is supplied by a motor 21 which is supported on platform 12. The output shaft of the motor is connected by a belt drive 22 to the input shaft 23 of a speed reducer 24.

In order to oscillate the spout 7 horizontally about the vertical pivotal axis, the output shaft 25 of speed reducer 24 is connected to a cam drive.

The cam drive comprises a pair of meshing bevel gears 26 and 27 with the gear 26 being secured to the output shaft 25 of reducer 24. The gear 27, as best seen in Fig. 6, is keyed to a vertical shaft 28 which extends downwardly through platform 12. Shaft 28 is journaled within sleeve 29 and cam disc 30 which are secured to the upper and lower surfaces, respectively, of platform 12.

A crank arm 31 is suitably keyed to the lower end of shaft 28 and is provided with a longitudinally extending guide way 32 which slideably receives a complementary slider 33.

A pin 34 extends vertically through the slider 33, and a roller 35 or cam follower is rotatably secured to the upper end of the pin. The roller is adapted to ride within a generally elliptical groove 36 formed in the undersurface of cam disc 30 as the crank arms move in accordance with rotation of shaft 28.

As the groove 36 is elliptical in shape, the slider 33 will move reciprocally within way 32 as the roller rides within the groove to correspondingly vary the effective length of the crank arm.

The motion of crank arm 31 is transmitted to the spout 7 through a link 37. One end of link 37 is rotatably secured to the lower extremity of pin 34, while the other end of the link is pivotally attached by a bolt 38 to the upper face of lug 39 which is welded in an upstanding relation to the upper surface of spout 7. This is shown best in Figs. 2 and 3.

The cam disc 30 is designed with a modified elliptical shape so that the working end of link 37, attached to lug 39, will move at the slowest speed as the spout 7 passes the mid-portion of its amplitude of oscillation so that the greatest amount of silage will be blown into the area toward the center of the silo, which contains the largest volume to be filled. If disc 30 were circular, the working end of link 37 would accelerate as the roller approached diametrical opposite positions on disc 30 laterally of the general direction of the axis through link 37. However, by proper selection of the cam surface, the working end of the link 37 can be made to move with variable speed and thus the spout 7 will oscillate at any desired velocity depending on the cross section of the silo to provide a uniform distribution of silage.

To enable the magnitude of oscillation of spout 7 about the vertical axis to be varied, the upper face of lug 39 is provided with a series of threaded holes 40 which are adapted to receive the bolt 38. The moment arm between the pivotal axis and the position of attachment of link 37 to lug 39 can be varied by changing the position of bolt 38 in the holes. By inserting the bolt 38 in the hole 40 nearest the silo 1, the moment arm is at a minimum and the swing or pivotal movement of the spout will be the maximum.

To pivot the hood 8 in a vertical manner about spout 7, rotation of the output shaft 25 of speed reducer 24 is transmitted through a sprocket drive 41 to a shaft 42 which is journaled within a sleeve 43. The outer end of shaft 42 is secured to an eccentric disc 44.

As seen in Figs. 2 and 5, the eccentric disc 44 is rotatably housed in a housing 45, and a lug projecting downwardly from housing 45 is pivotally connected within a recess formed in the upper end of piston 46 by a suitable pin so that the rotary motion of shaft 42 is transformed to a vertical reciprocating motion of piston 46 by the eccentric drive.

To guide the piston in reciprocating motion, the piston is slideably disposed within a guide cylinder 47. Reinforcement is given to sleeve 43 and guide 47 by a web plate 48 which is bolted to, and extends upwardly from platform 12.

The vertical reciprocating motion of piston 46 is transmitted to hood 8 through a swivel 49 and a pair of connecting side arms 50 so that the hood will pivot about the connection 9.

As the spout 7 and hood 8 also move horizontally about the vertical axis through bearing 16 and hub 18, the connection to the eccentric drive assembly must be able to pivot with this horizontal movement and this pivotal movement is accomplished by means of the swivel 49.

Swivel 49 comprises a hub 51 having an axial opening therethrough and a yoke 52 which extends downwardly from hub 51 and straddles bracket 19. A pin 53 is rotatably disposed within the opening in hub 51 and the upper end of pin 53 is secured within an aligned opening in the lower end of piston 46. By this connection swivel 49 may freely rotate about pin 53.

The lower ends of yoke 52 are connected to hood 8 by the respective side arms 50. To permit the arms to straddle hood 8, as shown in Fig. 5, the lower portion of the arms may be suitably outwardly offset.

The present invention provides an apparatus for effectively distributing silage throughout a silo. The hood 8 is given both horizontal and vertical motion with the resultant path inscribed by the hood being a modified sine curve. By employing different gear ratios for the cam drive and the eccentric drive, a particular sine curve inscribed by the hood will not be repeated during a normal filling operation but instead, the sine curve will be progressively advanced with each swing so that the silage is distributed uniformly throughout the entire silo. The silage is discharge laterally of the opening 4 to the silo walls, downwardly directly beneath opening 4, forwardly to the diametrically opposite portion of the silo wall and to all intermediate locations within the silo to achieve a level and uniform coverage.

The gear ratio of the cam drive and the eccentric drive may be made to differ by employing sprockets in sprocket drive 41 with different numbers of teeth. The cam drive operates in accordance with the gear ratio of the driving sprocket while the eccentric drive operates in accordance with the gear ratio of the driven sprocket and if these ratios are not simple multiples of one another, the path inscribed by hood 8 will not be repeated during normal filling of the silo.

To bring about the simultaneous horizontal and vertical motions, it is preferred that the axis of vertical motion be positioned in alignment with the vertical axis about which the hood 8 swings in horizontal motion. By aligning the axis of vertical motion and the pivotal axis of horizontal motion, two periodic motions of different frequencies are combined to bring about the resultant approximate sine curve motion.

After the filling operation has been completed, the spout 7 and hood 8 may be conveniently disengaged from the actuating mechanism and removed from the opening 4. The opening 4 may then be closed by a suitable cover plate to exclude air from the silo and prevent excessive spoilage of the silage. The cover plate may be bolted or otherwise attached to frame 11.

The spout 7 and hood 8 are removed by initially disconnecting the attachment between side arms 50 and the hood 8 which releases the hood from fixed attachment to the eccentric drive. The bolt 20 connecting hub 18 to bracket 19 and the bolt 38 connecting lever 37 to lug 39 are then removed and the spout 7 with the attached hood may then be lifted from thrust bearing 16 to complete the disassembly. The remaining mechanism may be left in position on platform 12 and provided, if necessary, with a suitable weather-proof cover.

Various embodiments of the invention may be employed within the scope of the following claims.

I claim:

1. A material distributing apparatus adapted to uniformly distribute loose material into a storage vessel through an opening in the upper portion thereof which comprises, a conduit extending within the opening and adapted to convey the material and discharge the same into the vessel, a hood pivotally secured to the discharge end of said conduit, a frame secured to the outer surface of the vessel, power means supported by said frame and connected to the discharge end of said conduit for pivoting said conduit in a generally horizontal plane about a vertical axis, a vertically reciprocating member carried by the frame and connected to said hood and the power means, said member being disposed in alignment with the vertical axis about which said conduit is pivoted and adapted upon reciprocation by the power means to pivot said hood vertically about the discharge end of said conduit as said conduit is simultaneously pivoted horizontally by said power means to drive said hood through an approximate sine curve path during horizontal reciprocation of the conduit and uniformly distribute the loose material to all portions of said vessel.

2. A material distributing apparatus adapted to uniformly distribute loose material into a storage vessel through an opening in the upper portion thereof which comprises, a conduit extending within the opening and adapted to convey the material and discharge the same into the vessel, a hood pivotally secured to the discharge end of said conduit, a frame disposed next to the outer surface of the vessel adjacent said opening, a cam drive carried by said frame and connected to the discharge end of said conduit for oscillating said conduit about a vertical axis with the speed of oscillation being slowest at the midpoint of the amplitude of oscillation to effect a uniform distribution of the material during said oscillation, a vertically reciprocating member carried by said frame and connected to said hood for pivoting said hood about said conduit in a vertical direction, said oscillation of said conduit and the pivoting of said hood being synchronized to permit said hood to inscribe a general sine curve path, and means for varying the phase of the sine curve path and preventing the hood from repeating an inscribed path during the filling of said vessel.

3. A silage distributing apparatus adapted to uniformly distribute the silage into a storage vessel through an opening in the upper portion thereof which comprises, a generally curved filler pipe extending within said opening and adapted to convey the silage and discharge the same into said vessel, a hood having an open lower portion pivotally attached to the discharge end of said pipe and adapted to direct the silage into the vessel, a frame disposed next to the outer surface of said vessel adjacent said opening, said discharge end of the pipe being pivotally attached to said frame to permit said pipe to be oscillated in a generally horizontal plane, a driving member connected to said discharge end of said pipe outwardly of the position of pivotal attachment of said pipe to said frame for oscillating said pipe, a vertically moving member carried by said frame and connected to the hood for pivoting said hood about said discharge end of the pipe, said oscillation of said pipe and the pivotal movement of said hood being synchronized to permit said hood to inscribe a generally sine curve path, and means associated with said driving member for decreasing the speed of oscillation of said pipe as said pipe approaches the mid-portion of its amplitude of oscillation to effect a uniform distribution of silage to all portions of said vessel.

4. A material distributing apparatus adapted to uniformly distribute loose material into a storage vessel through an opening in the upper portion thereof which comprises, a conduit extending within the opening and adapted to convey the material and discharge the same into the vessel, a hood pivotally secured to the discharge end of said conduit, a frame disposed next to the outer surface of the vessel, power means supported by said frame and connected to said conduit for pivoting the discharge end of the conduit in a generally horizontal plane about a vertical axis, means supported by said frame and connected to said hood and power means to pivot said hood vertically about the discharge end of the conduit as the discharge end of said conduit is simultaneously pivoted horizontally by said power means, and means to vary the pivotal movement of the hood in coordination with the pivotal movement of the discharge end of the conduit to vary the distribution within said vessel of the discharged material.

5. In a material distributing apparatus adapted to uniformly discharge and distribute a loose material into a storage structure through an opening in the upper portion thereof, a conduit extending within the opening and adapted to convey the material and discharge the same into the structure, a hood pivotally secured to the discharge end of the conduit, a frame secured to the structure adjacent said opening, supporting means connected to said frame and pivotally supporting the discharge end of the conduit for movement in a horizontal plane, a lever arm connected to the discharge end of said conduit and adapted to pivot the conduit discharge end horizontally about said supporting means, a cam member associated with said frame and having a generally elliptical cam surface, a cam follower adapted to ride on said cam surface and connected with said lever arm to actuate said arm and effect a variable speed of oscillation of said discharge end of the conduit throughout its amplitude of oscillation, and means to oscillate said hood in a vertical plane in coordination with the horizontal pivotal movement of the discharge end of the conduit to provide a uniform distribution of the loose material to all portions of the structure.

References Cited in the file of this patent

UNITED STATES PATENTS

| | | |
|---|---|---|
| 782,444 | Gibbons | Feb. 14, 1905 |
| 2,257,572 | Radue | Sept. 30, 1941 |